(12) United States Patent
Guy et al.

(10) Patent No.: US 8,271,598 B2
(45) Date of Patent: Sep. 18, 2012

(54) METHOD AND SYSTEM FOR EMAIL MESSAGING

(75) Inventors: Ido Guy, Haifa (IL); Boaz Mizrachi, Haifa (IL); Vladimir Soroka, Karmiel (IL)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 12/963,658

(22) Filed: Dec. 9, 2010

(65) Prior Publication Data

US 2011/0078587 A1  Mar. 31, 2011

Related U.S. Application Data

(62) Division of application No. 11/424,889, filed on Jun. 19, 2006, now abandoned.

(51) Int. Cl.
*G06F 15/16* (2006.01)
*G06F 3/00* (2006.01)

(52) U.S. Cl. .................................. 709/206; 715/752
(58) Field of Classification Search .................. None
See application file for complete search history.

(56) References Cited

U.S. PATENT DOCUMENTS

| | | | |
|---|---|---|---|
| 6,205,472 B1* | 3/2001 | Gilmour | 709/206 |
| 6,539,421 B1 | 3/2003 | Appelman et al. | |
| 6,832,245 B1* | 12/2004 | Isaacs et al. | 709/206 |
| 2002/0107930 A1* | 8/2002 | Itoh | 709/206 |
| 2003/0200263 A1* | 10/2003 | Goldberg | 709/206 |
| 2004/0039786 A1 | 2/2004 | Horvitz et al. | |
| 2004/0103162 A1* | 5/2004 | Meister et al. | 709/206 |
| 2004/0215726 A1 | 10/2004 | Arning et al. | |
| 2005/0198171 A1 | 9/2005 | Landsman et al. | |
| 2005/0204001 A1 | 9/2005 | Stein et al. | |
| 2006/0026244 A1 | 2/2006 | Watson | |
| 2007/0050455 A1 | 3/2007 | Yach et al. | |
| 2007/0050456 A1* | 3/2007 | Vuong et al. | 709/206 |

FOREIGN PATENT DOCUMENTS

| | | |
|---|---|---|
| EP | 1591939 | 11/2005 |
| WO | 2005074444 | 8/2005 |

OTHER PUBLICATIONS

Outlook Auto BCC (Source 1: http://www.filebot.org/Internet/E-Mail/item8615-5.htm) (Source 2: http://www.office-addins.com/-outlook-addins/outlook-auto-bcc.html).

* cited by examiner

*Primary Examiner* — Peling Shaw

(57) ABSTRACT

A method and system for preventing sending of messages to incorrect email recipients are provided. The method includes determining (120) the intended recipients of an email message prior to sending and comparing the intended recipients to defined recipient groups (126, 122). Potential errors in the intended recipients are identified and a prompt (125) is provided to amend the intended recipients. The prompt (125) provides a suggestion to replace, add or remove an intended recipient. The defined recipient groups include one or more of groups of recipients formed from an organization data structure (122), groups of recipients defined by a user, and groups of recipients (126) mined from one or more user's previous email correspondence.

15 Claims, 12 Drawing Sheets

FIG. 3A

| Name | Position | Department | Location |
|---|---|---|---|
| John Smith | Chief Executive Officer | Head Office | New York |
| ≻Mike Brown | Executive Assistant | Head Office | New York |
| ≻David Jones | Director of Operations | Head Office | New York |
| ≻Jane Green | Regional Manager | Sales | Miami |
| ≻Tom Black | District Manager | Sales | Tampa |
| ≻Fred Pink | District Manager | Sales | Miami |
| ≻Sue Red | Trainee | Sales | Miami |
| ≻Bruce White | Head of Legal Department | Legal | New York |
| ≻Patrick Blue | Attorney | Legal | New York |
| ≻Frank Silver | Attorney | Legal | New York |

METHOD AND SYSTEM FOR EMAIL MESSAGING

CROSS-REFERENCE TO RELATED APPLICATIONS

The subject Application is a divisional of U.S. patent application Ser. No. 11/424,889, filed 19 Jun. 2006.

FIELD OF THE INVENTION

This invention relates to the field of email messaging systems. In particular, this invention relates to preventing the sending of email messages to incorrect email recipients.

BACKGROUND OF THE INVENTION

Email messaging systems have become a regular form of communication for people in their work and social interactions. The use of email messages is particularly effective when communicating the same message to multiple recipients. The information that develops in a user's email application shows groups that the user communicates with. The groups may be defined by social activities, work, study, sport, committees, etc. This organizational information that exists in email messaging systems is very valuable to the user and any organization they work for.

People receive irrelevant email messages when users forward, reply to, or send email messages to irrelevant addressees by mistake. Receiving an irrelevant email message can be annoying as the recipient must ascertain that it is not intended for him, and this may waste valuable working time and distract the recipient from other tasks. Privacy may also be compromised by the wrong recipient receiving confidential information contained in an erroneously sent message.

Email messages are often sent to incorrect addressees when the sender is sending an email to a group of recipients. Much of email messaging traffic is generated by email messages addressed to a group of recipients and handling these groups of contacts in a careful way is desired. This will lower the chances of a recipient receiving an irrelevant message as well as protecting the sender's privacy.

Current email applications support groups of contacts in the following ways.

- Groups of users are predefined for the organization as a whole. For example, this is done in Lotus Notes for IBM (Lotus Notes and IBM are trade marks of International Business Machines Corporation). Most of the groups are taken from an organizational chart in which employees positions in the organization are defined.
- Users of email applications are able to manually define their own groups of contacts. In practice, most email users do not use the manual definition of groups and make use of only those groups who have been predefined for their organization.

SUMMARY

It is an aim of the present invention to provide a method and system for using groups of contacts in an email system in order to decrease the chances of sending an email message to an incorrect contact. It is also an aim to improve the protection of user privacy that may be affected by messages sent to large groups of contacts.

According to a first aspect of the present invention there is provided a method for email messaging, comprising: determining the intended recipients of an email message prior to sending, where there are two or more intended recipients; comparing the intended recipients to defined recipient groups; and providing a prompt to amend the intended recipients.

In one embodiment, the method includes identifying a potential error in the intended recipients compared to the defined recipient groups. Comparing the intended recipients to defined recipient groups may use a similarity measure to identify a potential error. The method may include comparing the intended recipients to defined recipient groups defined for a sender of the email message.

In another embodiment, the method includes identifying one or more of the defined groups which include the intended recipients, and providing a prompt to complete the list of intended recipients in accordance with an identified defined group.

Providing a prompt to amend the intended recipients may provide a suggestion to replace, add or remove an intended recipient.

The defined recipient groups may include one or more of: groups of recipients formed from an organization data structure, groups of recipients defined by a user, and groups of recipients mined from one or more user's previous email correspondence.

An organization data structure may define a Boolean value for each pair of an individual in an organization and a group indicating the likelihood of the individual sending a message to the group. The method may include comparing the pair of the sender of the email message and the group of intended recipients with the Boolean value for the pair to identify a potential error.

Groups of recipients may be mined from one or more user's previous email correspondence and ranked by the strength of the group. In one embodiment, groups may be defined as the set of the sender of a previous email message and the recipients of the message, and a ranking is applied to the defined groups according to the number of messages and/or the date of the messages. In another embodiment, groups may be defined by: building a graph with vertices of individuals who are senders and/or recipients of previous email messages joined by edges between individuals who correspond; and determining groups with many edges connecting vertices of a group and few edges between groups.

Identifying a potential error in the intended recipients may include: identifying a mismatch between the sender and the intended recipients according to an organization data structure. Identifying a potential error in the intended recipients may include identifying a mismatch between the intended recipients and a defined recipient group.

Providing a prompt to amend the intended recipients may add recipients to the intended recipients to complete a defined recipient group. Providing a prompt to amend the intended recipients may also suggests moving intended recipients from a "to" addressee list to a blind carbon copy ("bcc") addressee list, if the number of intended recipients exceeds a threshold value.

According to a second aspect of the present invention there is provided a computer program product stored on a computer readable storage medium, comprising computer readable program code means for performing the steps of: determining the intended recipients of an email message prior to sending, where there are two or more intended recipients; comparing the intended recipients to defined recipient groups; and providing a prompt to amend the intended recipients.

According to a third aspect of the present invention there is provided a system for email messaging comprising: a data structure of defined recipient groups; an agent including:

means for determining the intended recipients of an email message prior to sending, where there are two or more intended recipients; and means for comparing the intended recipients to the defined recipient groups; and a prompt means on a graphical user interface to generate a prompt to amend the intended recipients.

The agent may includes means for identifying a potential error in the intended recipients. The agent may include means for identifying one or more of the defined groups which includes the intended recipients, and the prompt means may generate a prompt to complete the list of intended recipients in accordance with an identified defined group.

The agent may be provided as part of an email client application in which the email message is created. Alternatively, the agent may be provided by a server over a network to an email client application in which the email message is created.

The data structure of predefined recipient groups may be an organization data structure. The data structure of predefined recipient groups may store recipient groups mined from one or more user's previous email correspondence.

According to a fourth aspect of the present invention there is provided a method of providing a service to a customer over a network, the service comprising the method steps of: determining the intended recipients of an email message prior to sending, where there are two or more intended recipients; comparing the intended recipients to defined recipient groups; and providing a prompt to amend the intended recipients.

According to a fifth aspect of the present invention there is provided a method for email messaging, comprising: determining the number of intended recipients of an email message prior to sending; determining if the number of intended recipients exceeds a predefined threshold number; and if the number of intended recipients exceeds the threshold number, providing a prompt to transfer the intended recipients to blind carbon copy ("bcc") addressees.

The intended recipients may be separate "to" or carbon copy ("cc") addressees and the method may include automatically transferring addressees from "to" and/or carbon copy ("cc") addressees following a user response to the prompt.

The embodiments of the present invention include the advantage that the content of an email message is not used to determine the predefined recipient groups or when comparing the intended recipients to predefined recipient groups. This means that sensitive content data is not accessed and the method is language independent.

The user input is also minimal as the user may accept or reject prompts to amend the intended recipients.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The described method and system provide a prompt when a user is forwarding, replying to, or sending an email message, to check if the email is intended to be sent to the message addressees. The described method and system provide an opportunistic approach which aims to prevent irrelevant email messages being sent.

Email applications are extended in a way that assists email users in sending messages to the correct addressees in groups and helps users avoid common mistakes related to email addressee groups. According to the described approach, upon sending an email message to a group (either a predefined group or just a set of several individual addresses), the email user may be provided with appropriate recommendations and warnings, based an organizational chart, the user's own social or contact network, and other factors as described below.

Figure 1:
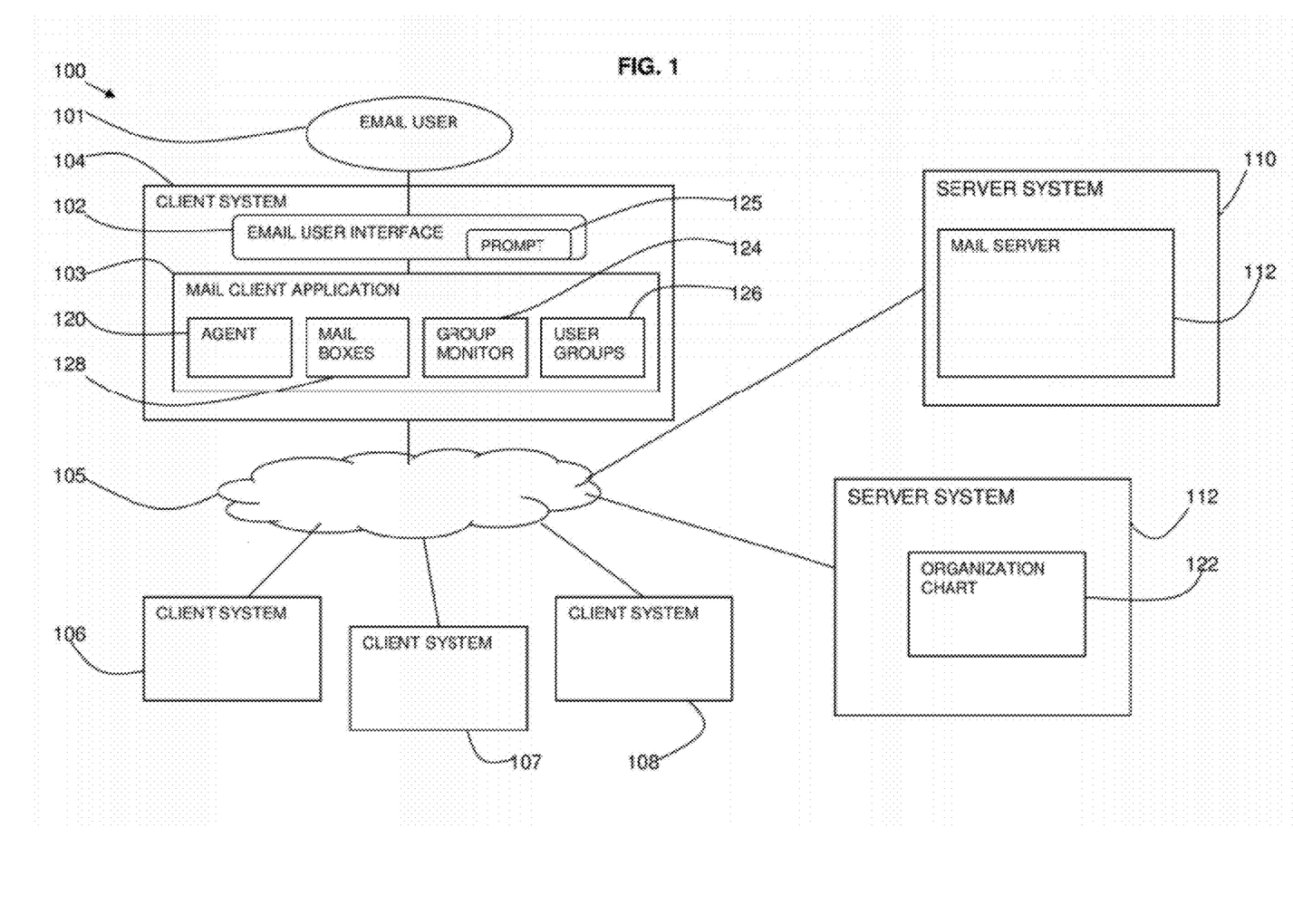
FIG. 1 is a block diagram of an email system in accordance with embodiments of the present invention.

Referring to FIG. 1, an email system 100 is shown including an email user 101 who interacts with an email user interface 102 of an email client application 103 running on a client computer system 104. The email client application 103 may be a stand alone email application or part of a combined scheduling and calendar application.

The email client application 103 communicates via a network 105 with other client computer systems 106-108 each running their own email client application. A server system 110 provides an email server application 112 for the email client application 103.

The email client application 103 enables a user to organize their email messages by creating folders for storing mail 128, searching through email messages, keeping an address book of people to whom the user sends email messages, creating group mailing lists, creating and adding a signature file, and many more functions.

In the described system, an agent 120 is provided which reviews a list of intended recipients in an email message created by a user to check if the list of intended recipients is likely to include any incorrect recipients. The agent 120 reviews the list of intended recipients using a provided algorithm. A prompt 125 is provided in the form of a dialogue box on the email user interface 102 if the agent 120 determines that the user should review one or more of the intended recipients of the email message. The prompt 125 on the email user interface 102 may include appropriate recommendations, warnings, etc. The user 101 can select the relevant/irrelevant addressees and amend the email message appropriately or the user 101 can choose to disregard the prompt 125.

The agent 120 can be provided as part of the email client application 103. Alternatively, the agent 120 can be provided as a service provided over a network from a server.

An email user 101 can configure the agent 120 to provide the desired prompts 125 tailored to the user's requirements. This configuration of the agent 120 can include a complete disablement of the agent 120.

The agent 120 uses an algorithm to review the list of intended recipients. The algorithm is based on correct group data. The correct group data may be determined by any one or more of the following: predefined organizational groups, the groups defined by the user in his email application 103, and/or groups previously used by the user.

Predefined organizational groups can be provided by an organizational chart 122 which may be provided on an organization's server system 112. The server system 112 on which the organization chart resides may be the same or different to the server system 110 of the email server application 112.

A user can define groups of recipients in his email client application 103. These defined groups can be used as correct groupings by the agent 120.

Community or group information can also be gathered from previous messages in one or more user's client email application 103. A group monitor 124 determines groups or communities based on previous email correspondence of the user 101. A data structure 126 holds a ranking of groups within which a user corresponds based on previous email correspondence. Each group includes meta-data such as a graph representing the internal relationships, the number of messages sent to it, and dates of correspondence. Based on this meta-data, the rank of the group is determined. The data structure is persistently stored either locally to the client system 104, remotely on a server system 110, 112, or duplicated across a client/server system.

Figure 2:
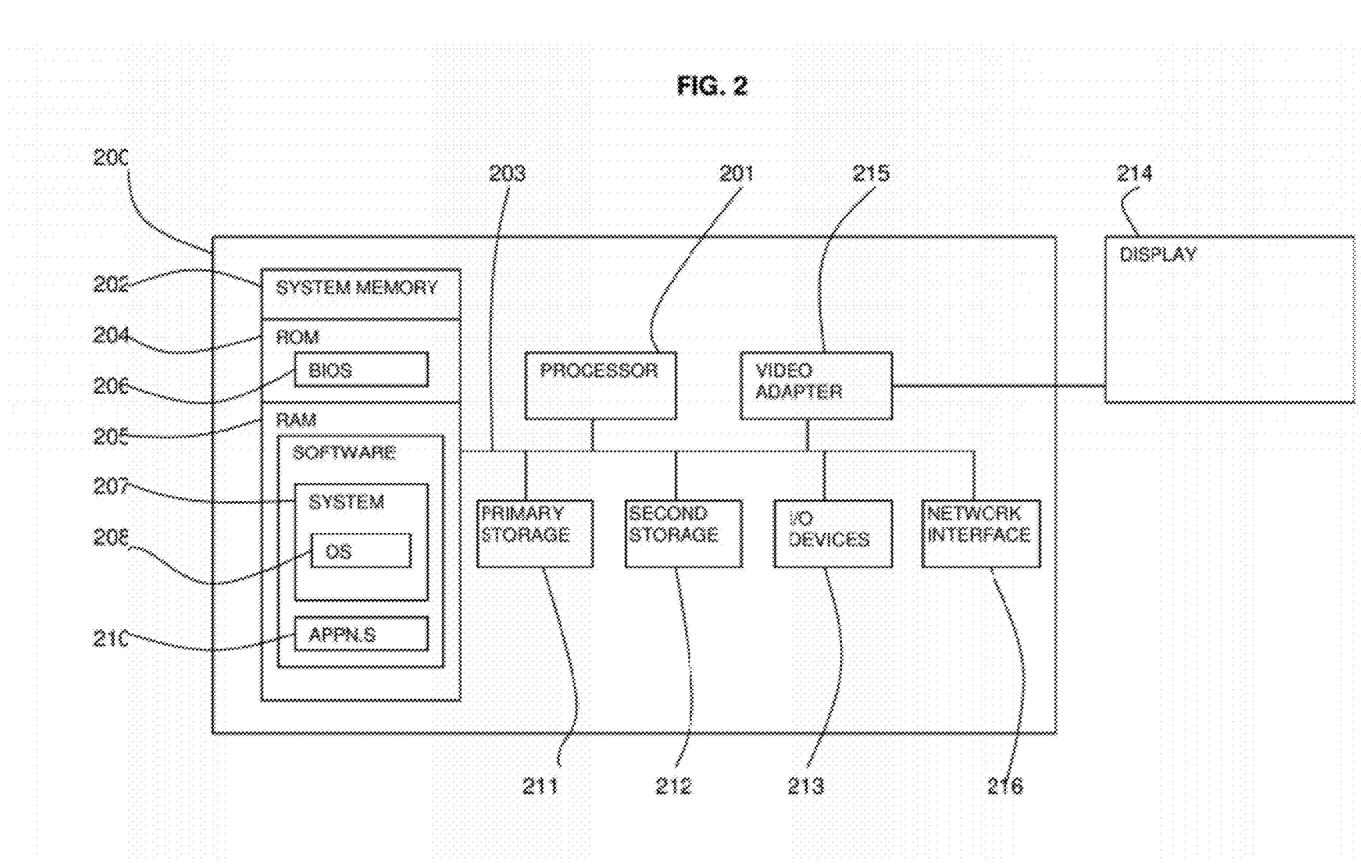
FIG. 2 is a block diagram of a computer system in which the embodiments of the present invention may be implemented.

Referring to FIG. 2, an exemplary system for implementing a client system 104 includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

The agent 120 uses correct group data to review a list of intended recipients. Correct group data is provided by different sources and provides reliable information on members belonging to recognised groups.

Correct group data may be provided by an organization data structure defined for an organization. Such a data structure 122 may be provided on a server system 112 and accessed by the agent 120 of the email client application 103 via the network 105. The organization data structure may be defined in many different ways but generally takes the form of a hierarchical data structure with members of the organization ordered in the hierarchy. Organization data structures may be defined for any form of organization and the user may have access to more than one organization data structure if he belongs to more than one organization, for example, his employer, professional body, committees, etc.

Figure 3A:
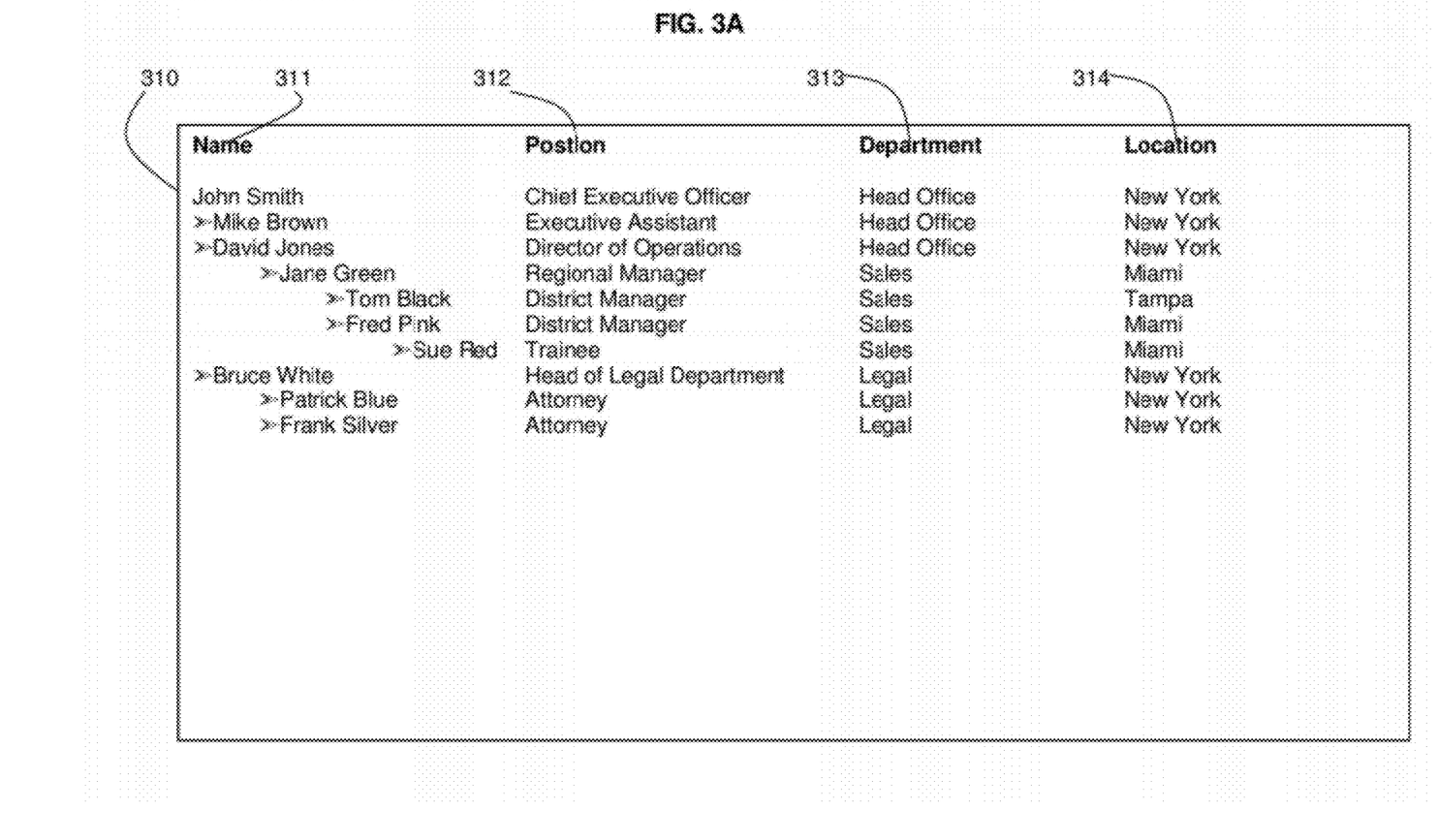
FIGS. 3A and 3B are examples of organization data structures used in accordance with embodiments of the present invention.
Figure 3B:
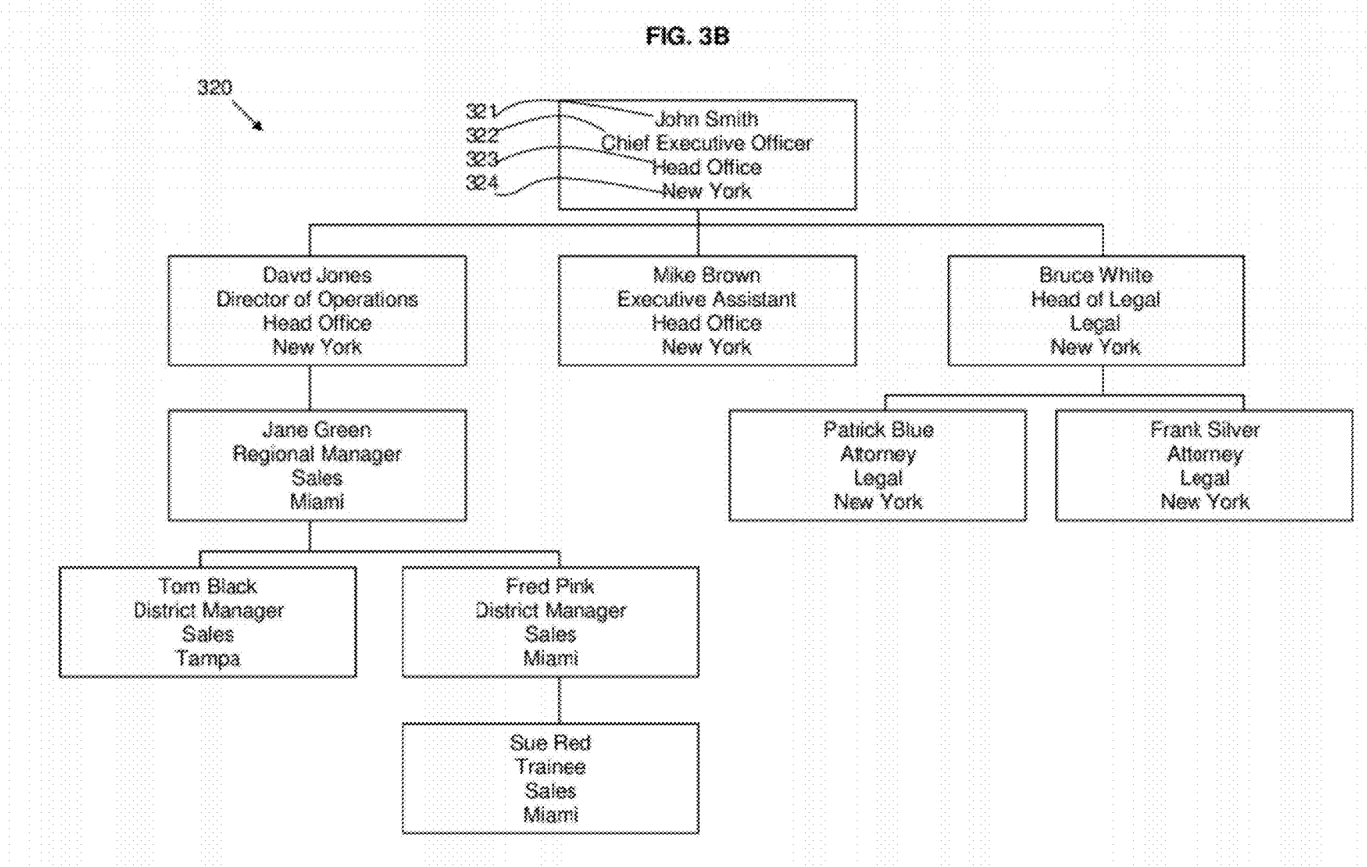

As examples, two forms of organization data structures are shown in FIGS. 3A and 3B of company structures. In FIG. 3A, a data structure 310 is shown in the form of a list hierarchy with a member's name 311, position 312, department 313, and location 314. The chief executive officer 314 of the company is listed at the top with members of the company provided in order of seniority with their department members.

In FIG. 3B, a data structure 320 is shown in the form of an organization chart with a chief executive officer 324 at the root node, with child nodes showing employees designated to each superior node. Information, relating to a member is provided at the node, for example, name 321, position 322, department 323, and location 324.

In any form of organization data structure, groups can be retrieved by common elements, such as location, department, position or ranking, etc. Members of a group having one or more common elements are extracted from the data structure. For example, regional managers in United States, or trainees in the state of California, or legal department members across the organization, etc.

The data structure defines a Boolean value for each pair of an individual and a group. This value indicates whether the individual is likely to send a message to the group. Groups are defined within the data structure for each recognisable set or sub-set of the structure.

Boolean values are given in a matrix M that includes rows for all employees and columns for all groups whose size is larger than a threshold t. Each cell has a value of 1 if the employee is likely to send to the group, 0 otherwise. The values may be set by a system administrator or by a set of rules. The rules may be set according to organization data structure parameters. When employee x sends to group g whose size is larger than t, the value of M[x][g] is considered. If it is 0, an appropriate warning is issued.

For example, a rule may say that each employee is likely to send to the smallest group she belongs to. The rules should also take into account the level of the employee in the organization data structure hierarchy. Normally, the higher the level is, the larger the groups the employee is likely to send to.

Correct group data may also be provided in an email client application 103 in which a user has defined correct group members under a group heading. For example, members of a football squad that meet regularly may all be defined in a user's email client application under the heading "Football".

Correct group data may also be provided by mining an email client application 103 for group information. This is referred to as the user's social network. The group monitor 124 shown in FIG. 1 uses group information for determining when a prompt is need to a user. Based on previous email correspondence of the mailbox owner, a list of the groups or communities with which the user corresponds is constructed.

This procedure can also be applied centrally to multiple email client applications to determine group information mined from users across an organization. Such correct group data may be stored centrally on a server and accessed by each email client application via a network.

The groups in the list are ranked according to their strength. A strength of the groups is determined by the number of messages sent to its members, the dates of these messages, and the number of members in the group.

Two examples of how a ranked list of the groups can be achieved are described.

In one embodiment, the messages in one or more mailboxes are reviewed. Each message defines a group which is a set of the following: the sender of the message, the recipients in the "to" list, recipients in the "cc" list and the recipients in the "bcc". The mailbox owner is not removed from this set to provide a group the mailbox owner would send to.

Each message adds a unit to the score of the group it defines. After reviewing all messages, a list of groups is formed where the score of each group is the number of messages sent to it. Sorting the list by score in descending order gives the desired ranked list of groups. Some adjustments can be made to the score each message gives to its group by taking the date of the message into account, i.e. messages with a more recent date will give higher score to their group.

In a second embodiment, a method is based on a graph built based on the headers of messages in one or more mailboxes. This graph is then partitioned into groups. Details can be found in the following paper: http://www.hpl.hp.com/research/idl/papers/email/index.html. The paper describes automatic identification of communities from email logs within an organization. An algorithm is used that finds communities within a graph representing information flows.

A method is described in the referenced paper in which vertices represent people (senders and recipients of email messages) and edges are added between people who correspond. Subsets of vertices with many edges connecting vertices of the same subset and few edges lying between subsets define community structure. Inter-community edges of highest betweeness are identified and removed leaving the defined communities. The groups detected by the algorithm can be ranked by the total weight of the corresponding edges in the graph.

Using either of the embodiments, the conclusion of the process is a ranked list of the mailbox's or mailboxes' groups. This list can be stored in a persistent location on an individual client system or on a server. Upon sending a message to a group, a group correction or group completion can be achieved by using the groups in the ranked list.

The intended group is compared to the list of popular groups with which the sender corresponds. If the group to which the email is proposed to be sent differs by one person, then an appropriate suggestion (to either add or change an addressee) is issued.

Figure 4:
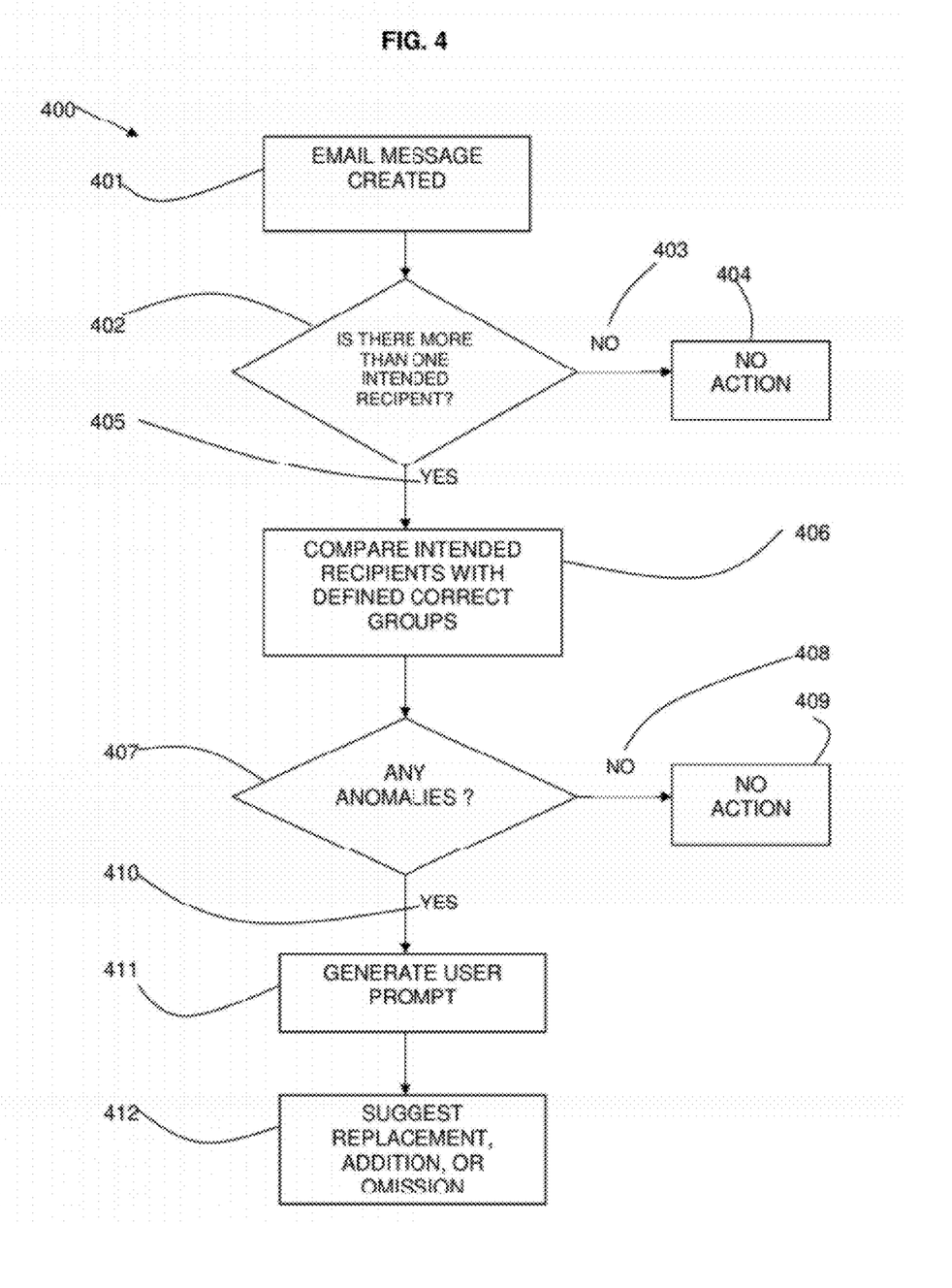
FIG. 4 is a flow diagram of an overall method in accordance with embodiments of the present invention.

Referring to FIG. 4, a flow diagram 400 is shown of the method carried out by the agent 120. An email message is created 401 by a user of an email client application and it is determined 402 whether there is more than one intended recipient of the message. If there is a single recipient 403, then no action is taken 404 by the agent.

If there is more than one intended recipient 405, the intended recipients are compared 406 with defined correct groups. The defined correct groups may be retrieved from an organization data structure, may be defined by the user in the email client application, or may be retrieved from a ranked list of groups mined from the user's mailbox.

It is determined 407 if there are any anomalies between the intended recipients and the defined correct groups. If there are no anomalies 408, then no action is taken 409 by the agent. If there is one or more anomaly 410, then a relevant prompt is generated 411 and an action suggested 412. A suggested action may be to replace, add or omit a recipient.

The following are example categories of occurrences or anomalies that may be monitored by the agent 120 as a user creates an email message with more than one intended recipient, instigating a prompt by the agent 120.

1. A user sending an email message to a predefined group, which is highly unlikely according to the organizational chart or involves special risks.

An example of this would be that if a director sends a message to all employees, no warning will be issued, but when a regular employee does so, an appropriate warning window will pop up. Some of the mistakes of this kind are caused by inadvertently using the "reply all" option rather than the "reply".

Another example would be when a user belongs to a group with a similar name to another group. For example, if a member of the "Information Services" group types by mistake "Information Retrieval", an appropriate warning will be issued. This will be done in spite of the fact that the typed group is a correct name of a predefined group, but according to the organizational information the group is unlikely to be correct.

2. Group correction.

This category includes correcting a specific address in a group which is highly unlikely to be included. For example, an email message may be created to be sent relating to a particular project to the project members. A mistake to include "Beth Brown" instead of "Beth Brownholtz" may be identified as the project members form a group which is regularly used by the user. According to the user's social communities and possibly the syntactic similarity between the addresses, a correction will be suggested.

Syntactic similarity occurs, for example, when two addresses in the organization differ by one character or when both have the same prefix. (For example, beth_brown/us/company and beth_brownholtz/uk/company, or john_smith/almaden/company & john_smith/haifa/company).

Similarity scores can be computed of the username to other usernames and a threshold set for deciding that the name sufficiently similar to raise a warning. The similarity score can be based on text similarity techniques, but should take into account both edit distance (how many characters need to be replaced to get from one string to another) and prefixes, as mentioned above.

Similarly, the mistake may be identified if all the intended recipients belong to an organization's department with the exception of one incorrect member.

The category also includes adding a specific address that is normally included in a group.

For example, when creating an email message from a previous message and not using the "reply all" option, users tend to forget to include the sender of the original message in the list of recipients. This can occur by the user copying just the "to" list and the "cc" list and forgetting to include the original sender. Based on the user's social communities, a suggestion to include a certain individual will be prompted in case the group is missing one of its regular members.

In another example, inclusion of certain individuals may be inferred by the inclusion of others. An individual X may be copied on all correspondences with an individual Y. Based on previous correspondence, in which individual Y is always copied correspondence to individual X, an appropriate suggestion will be made.

3. Group completion.

When typing a list of individual addresses, a completion will be offered to the user upon request of the most likely possibilities to complete the group according to the user's social network. The rank of the possibilities can include parameters such as the total amount of communication with the group, the size of the group, the communication in the last week/month, etc.

Similarly, the most likely possibilities to complete a group can be determined according to the user defined groups, or according to groups of an organizational data structure.

4. Automatic conversion of addresses to the "bcc" list.

When sending an email message to a large number of individual addresses, the prompt may suggest an automatic move of the addresses from the "to" list to the "bcc" list with the "to" list remaining empty, or containing the sender's own address, or just a dummy address. This should be done both for security reasons, to prevent email addresses being explicitly distributed among many users, and for privacy reasons. The "bcc" (blind carbon copy) list sends a message to the listed recipients in a way that the message they receive does not contain a complete list of recipients.

All of the above can be carried in an off-line or on-line mode.

The following is an example pseudo code upon user x sending to group g:

If g is a predefined organizational group and M[x][g]=0
  Issue a warning (are you sure you want to send to g whose size is g.size)
For each group g' in the top ranked list of groups with which the user corresponds
  If g is similar to g' (i.e. misses one contact or has one different contact than)
    Issue an appropriate recommendation (to either add or change the contact)
  If g includes more than t' (where t' is a certain threshold) separate addresses
    Issue a recommendation to move all recipients to the bcc list Group completion is done based on an explicit user request and thus is not included in this example pseudo code. The pseudo code may be extended to include checking for similarity of groups with the predefined organizational groups and/or the predefined user groups:

For each predefined organizational group g'', or predefined user group g'''
  If g is similar to g'' or g''' (i.e. misses one contact or has one different contact than)
    Issue an appropriate recommendation (to either add or change the contact)

FIGS. 5A to 5D are flow diagrams illustrating the above methods.

Figure 5A:
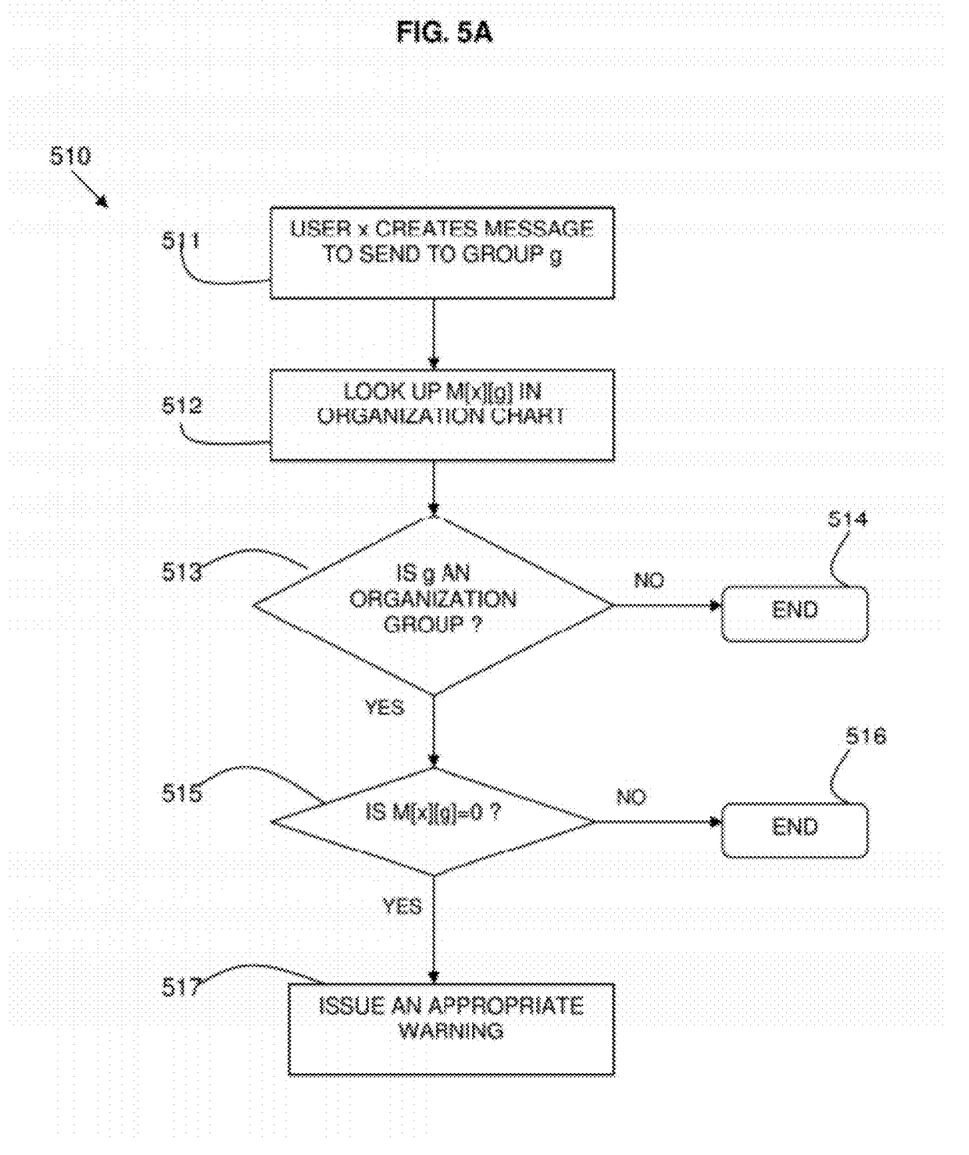
FIGS. 5A to 5D are flow diagrams of methods of determining potential errors in addressee groups in accordance with embodiments of the present invention.

FIG. 5A shows a flow diagram 510 of a method of comparing a proposed group of recipients g to an organization data structure. A user x creates 511 a message to send to a group g. The Boolean value M[x][g] in a matrix M generated for groups of an organization data structure is looked up 512. It is determined 513 if g is a predefined organizational group. If it is not a predefined organizational group, then the method ends 514. However, if g is a predefined organizational group, it is determined 515 if M[x][g]=0. If M[x][g]≠0, no warning is issued 516. If M[x][g]=0, a warning is issued 517 as this indicates that the user x is unlikely to send a message to this group.

Figure 5B:
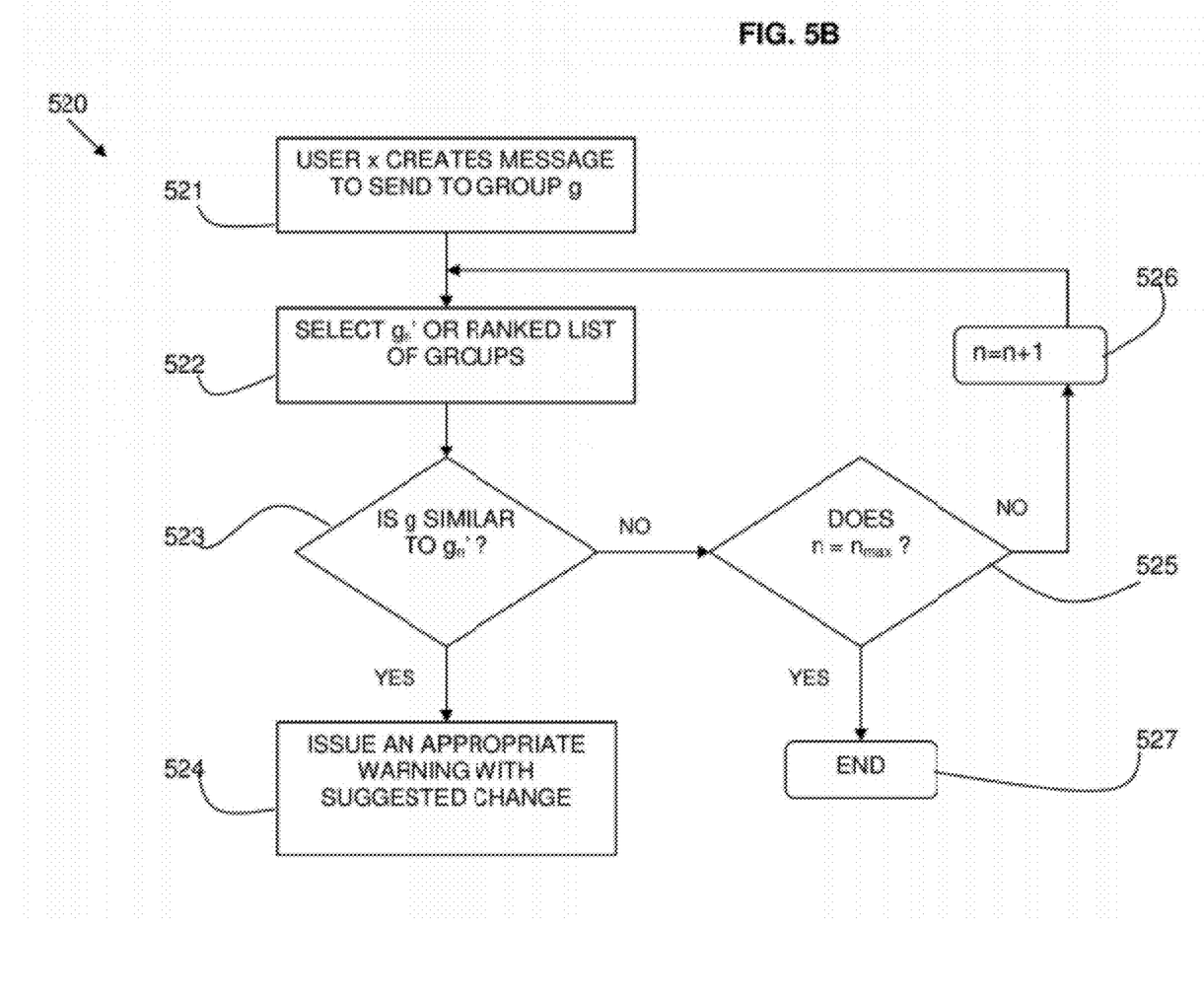

FIG. 5B shows a flow diagram 520 of a method of comparing a proposed group to groups mined from a user's mailbox. A user x creates 521 a message to send to a group g. Group $g_n$' is selected 522 from the top ranked list of groups. It is determined 523 if g is similar to $g_n$'. If it is similar, a warning with an appropriate change is provided 524. If g is not similar to $g_n$', it may either be the same, or dissimilar. It is determined 525 if $n=n_{max}$ or if there is at least another group $g_n$' in the ranked list. If there is another group, $g_n$' is changed to $g_{n+1}$' 526 and the method loops to step 522. If there are no further groups, the method ends 527.

The method of FIG. 5B may also be applied to compare a proposed group to other correct data groups, for example, groups of an organizational data structure or groups defined by a user.

Figure 5C:
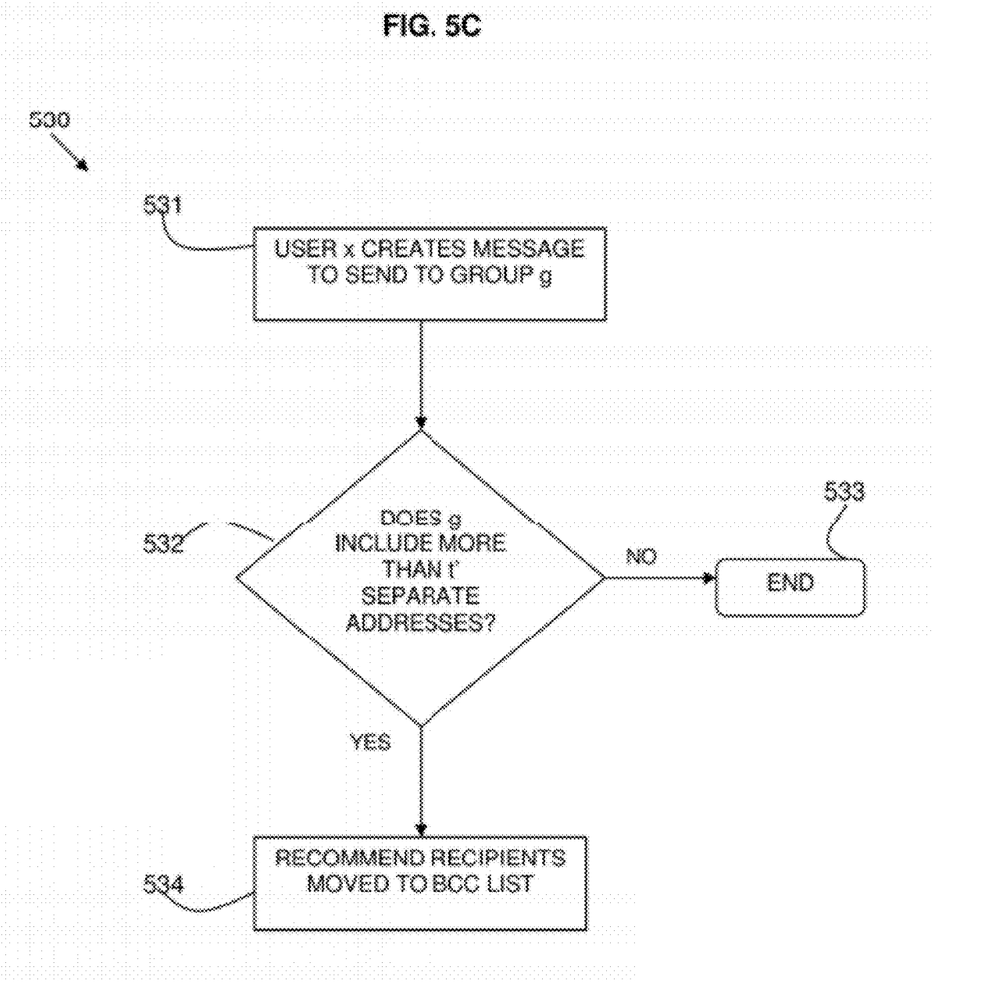

FIG. 5C shows a flow diagram 530 of a method of determining if a list of addressees should be amended to move the addressees to a bcc list. A user x creates 531 a message to send to a group g. It is determined 532 if g includes more than t' separate addresses, where t' is a predefined threshold. If the threshold is not exceeded, no action is taken and the method ends 533. If the threshold is exceeded, a recommendation is issued 534 to move all the recipients to the bcc list for security.

Figure 5D:
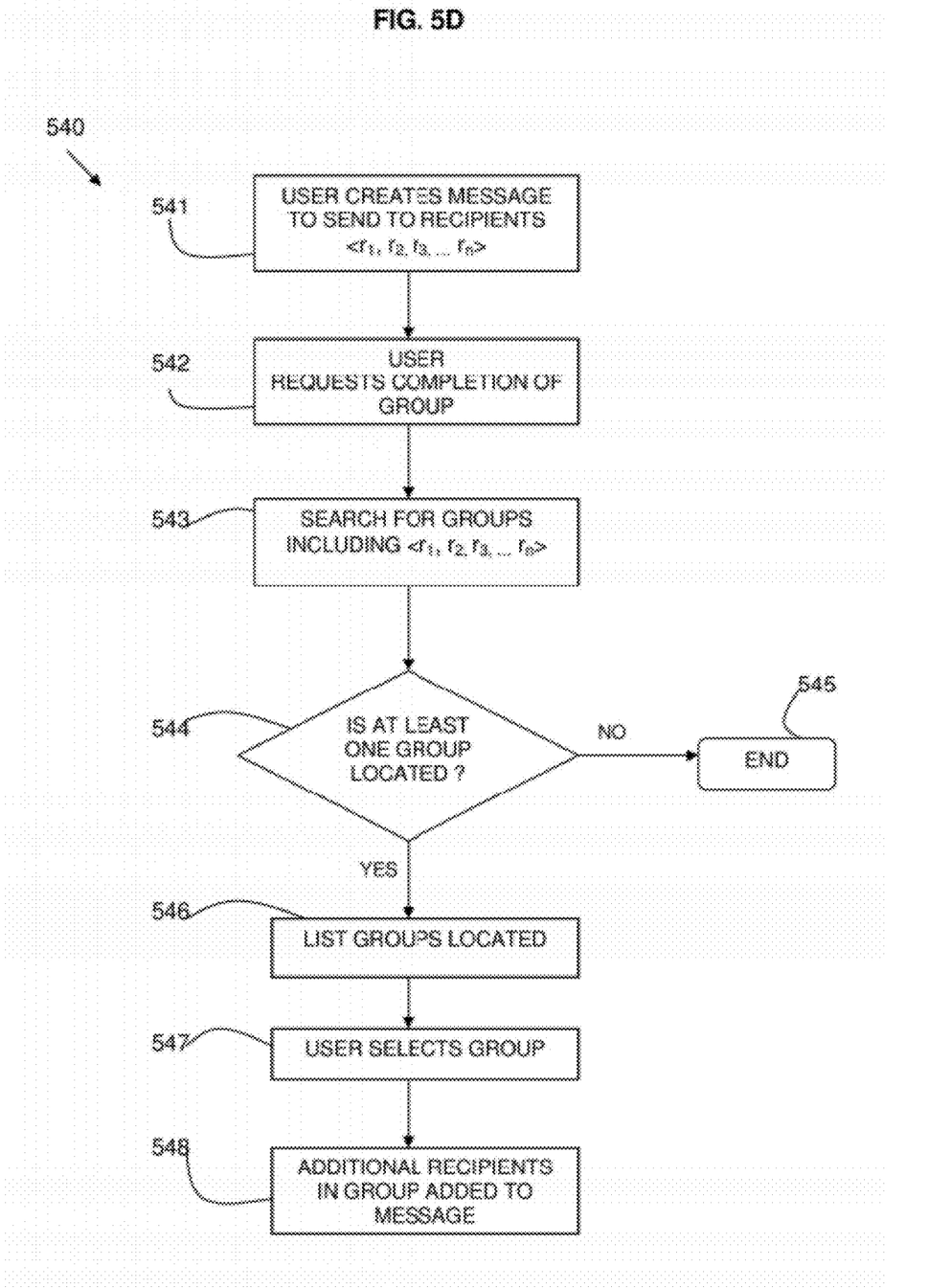

FIG. 5D shows a flow diagram 540 of a method of completion of groups. A user creates 541 a message to send to a plurality of recipients <$r_1, r_2, r_3, \ldots r_n$>. The user requests 542 completion of the group. The defined groups (for example, in an organization data structure, user defined groups, or groups mined from mailboxes) are searched 543 to identify groups including the members <$r_1, r_2, r_3, \ldots r_n$>. It is determined 544 if one or more groups are identified. If no groups are identified, this is reported 545 to the user. If one or more groups are identified, a list is displayed 546 to the user who selects 547 the appropriate group. The remaining members of the chosen group are added 548 to the list of recipients of the message.

A combination of one or more of the above methods can be applied to a message. For example, if a group is corrected according to FIG. 5B, it may then be determined if the corrected group is appropriate according to the method of FIG. 5A. Similarly, if a group is completed according to the method of FIG. 5D, it may then be determined if the number of recipients is above the threshold according to the method of FIG. 5C. Other combinations are also applicable.

Figure 6A:
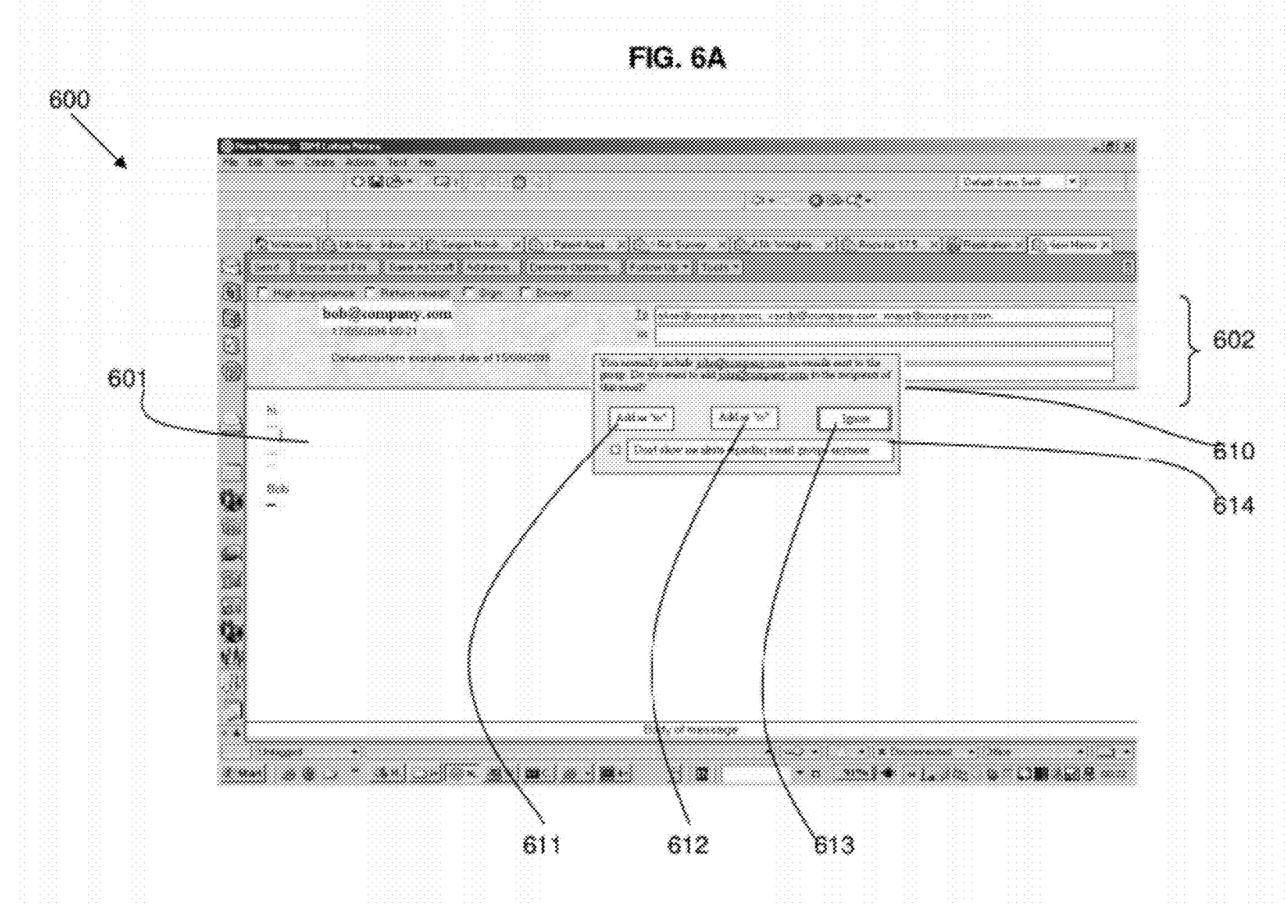
FIGS. 6A to 6C are representations of graphical user interfaces in accordance with embodiments of the present invention.
Figure 6B:
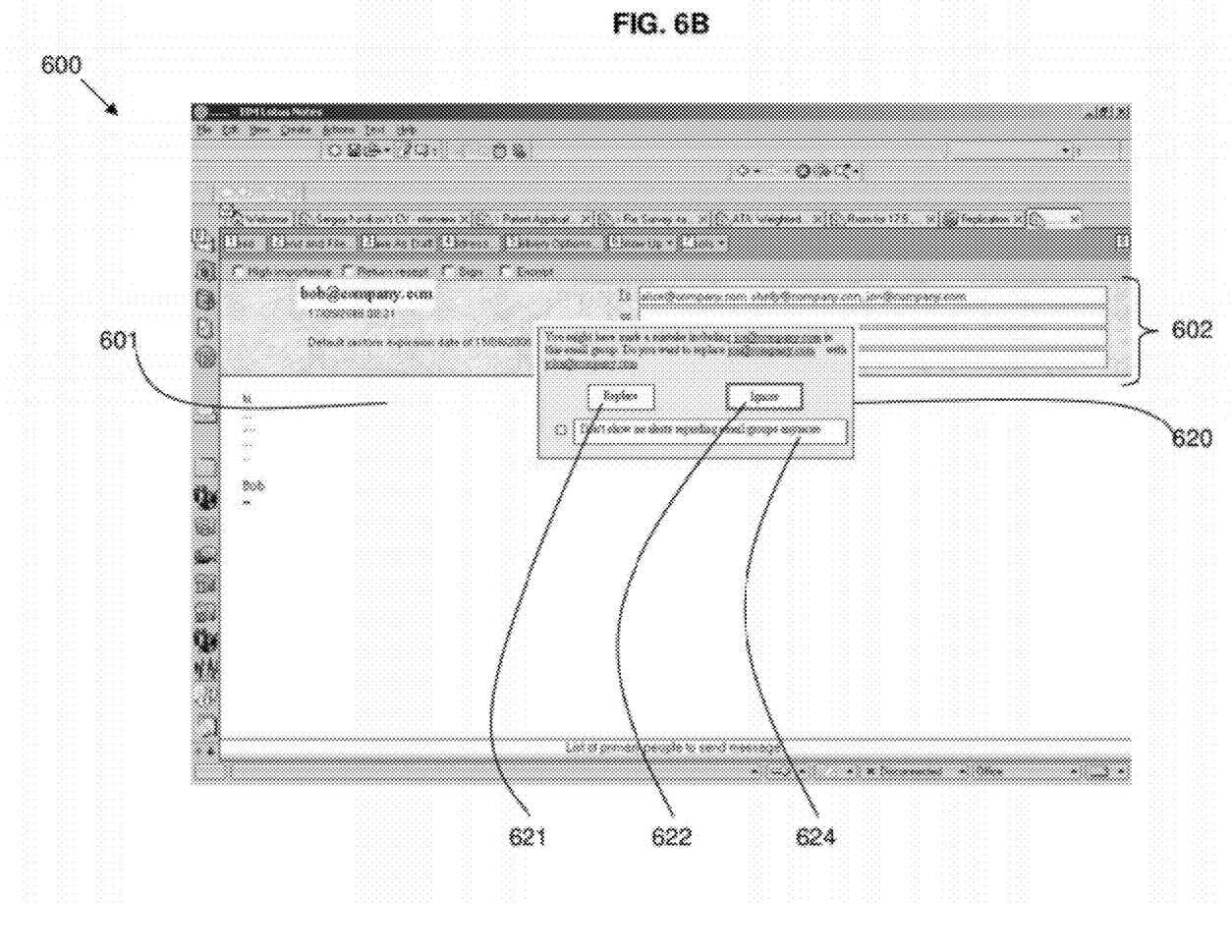
Figure 6C:
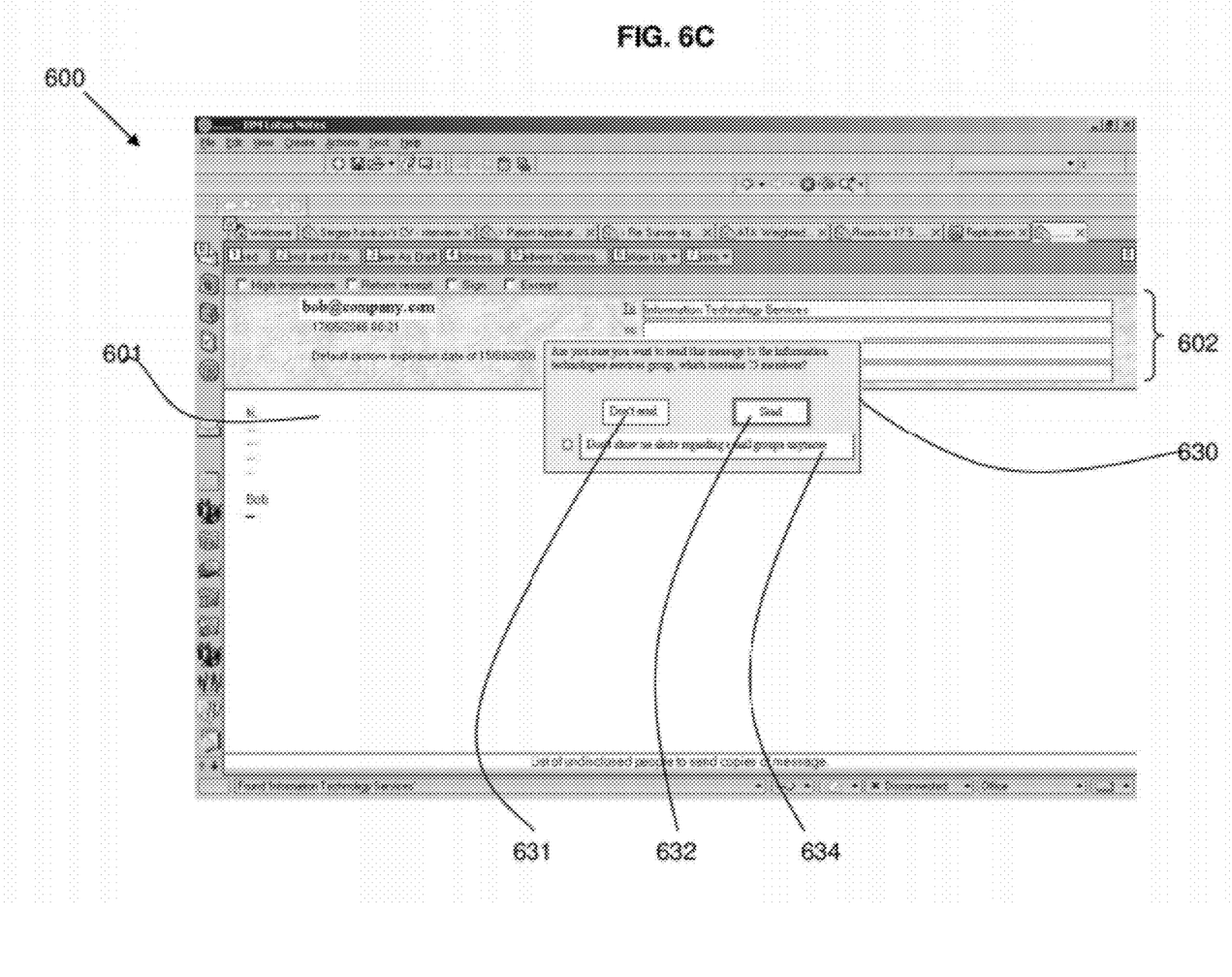

Referring to FIGS. 6A to 6C, examples of prompts provided on a graphical user interface are shown. In each of the figures, a graphical user interface 600 of an email client application is shown in which a new message 601 has been created. The message 601 has a list of intended recipients 602 formed of the "to" addressees, "cc" addressees, and "bcc" addressees.

In FIG. 6A, a prompt in the form of a dialog box 610 is shown which recommends adding a member to a group. The intended recipients have been compared to correct groups, in this case mined from the user's mailbox, and an omission identified. The dialog box 610 suggests an additional recipient and has input options to add the recipient to the "to" addressees 611, to add the recipient to the "cc" addressees 612, or to ignore 613. An option is also provided to disable the prompt 614.

In FIG. 6B, a prompt in the form of a dialog box 620 is shown which recommends replacing a member of a group. The intended recipients have been compared to correct groups, in this case mined from the user's mailbox, and a correction identified. The dialog box 620 suggests a replacement and has input options to replace 621 or ignore 622 the replacement. An option is also provided to disable the prompt 624.

In FIG. 6C, a prompt in the form of a dialog box 630 is shown alerting a user before sending an email to a large group which is unlikely according to the organization chart. The dialog box 630 queries the send action and has input options abort the send 631 or to continue with the send 632. An option is also provided to disable the prompt 634.

The method of providing a prompt to correct or complete intended recipients or to transfer recipients to a bcc list may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for email messaging, comprising:
   executing an email client application on a computer system;
   with a user interface of the email client application determining intended recipients of an email message prior to sending, wherein there are two or more intended recipients;
   determining that the intended recipients comprise a sub-group of one or more defined recipient groups, wherein each of the defined recipient groups has a plurality of other members;
   ranking the defined recipient groups according to a pre-defined strength function;
   identifying one of the defined recipient groups as a top ranked recipient group among the defined recipient groups;
   providing a prompt to select the top ranked recipient group to thereby add all of the other members of the top ranked recipient group as new recipients of the email message so as to direct the email message to all the members of the top ranked recipient group; and
   responsively to a user response to the prompt automatically adding all the other members as addressees of the email message.

2. The method as claimed in claim 1, further comprising providing a transfer option prompt to amend the intended recipients by moving the intended recipients from a "to" addressee list to a blind carbon copy ("bcc") addressee list when a number of the intended recipients exceeds a threshold value; and
   automatically transferring the intended recipients to the bcc addressee list responsively to a user transfer response to the transfer option prompt.

3. The method according to claim 1, further comprising the steps of: providing an additional prompt to add a plurality of members of other defined recipient groups as new recipients of the email message so as to direct the email message to all the members of the other defined recipient groups; and
   responsively to a user response to the additional prompt automatically adding the plurality of members of the other defined recipient groups as the new recipients of the email message.

4. The method according to claim 1, further comprising deriving the defined recipient groups from senders and recipients of previous email messages, wherein the strength function comprises at least one of a number and respective dates of the previous email messages.

5. The method according to claim 1, further comprising the step of deriving the defined recipient groups comprises defining a variable for each pair of an individual in an organization and the organization that indicates a likelihood of the individual sending email correspondence to the organization.

6. A computer software product for email messaging, including a non-transitory computer-readable storage medium in which computer program instructions are stored, which instructions, when executed by a computer, cause the computer to perform a method comprising:
   executing an email client application;
   with a user interface of the email client application accepting as input intended recipients of an email message prior to sending, wherein there are two or more intended recipients;
   determining that the intended recipients comprise a sub-group of one or more defined recipient groups, wherein each of the defined recipient groups has a plurality of other members;
   ranking the defined recipient groups according to a pre-defined strength function;
   identifying one of the defined recipient groups as a top ranked recipient group among the defined recipient groups;
   providing a prompt to select the top ranked recipient group to thereby add all of the other members of the top ranked recipient group as new recipients of the email message so as to direct the email message to all the members of the top ranked recipient group; and
   responsively to a user response to the prompt automatically adding all the other members as addressees of the email message.

7. The computer software product as claimed in claim 6, wherein the instructions cause the computer to perform the additional steps of:

providing a transfer option prompt to amend the intended recipients by moving the intended recipients from a "to" addressee list to a blind carbon copy ("bcc") addressee list when a number of the intended recipients exceeds a threshold value; and automatically transferring the intended recipients to the bcc addressee list responsively to a user transfer response to the transfer option prompt.

8. The computer software product according to claim 6, wherein the instructions cause the computer to perform the additional steps of:

providing an additional prompt to add a plurality of members of other defined recipient groups as new recipients of the email message so as to direct the email message to all the members of the other defined recipient groups; and responsively to a user response to the additional prompt automatically adding the plurality of members of the other defined recipient groups as the new recipients of the email message.

9. The computer software product according to claim 6, wherein the instructions cause the computer to perform the additional step of deriving the defined recipient groups from senders and recipients of previous email messages, wherein the strength function comprises at least one of a number and respective dates of the previous email messages.

10. The computer software product according to claim 6, wherein the instructions cause the computer to perform the additional step of deriving the defined recipient groups by defining a variable for each pair of an individual in an organization and the organization that indicates a likelihood of the individual sending email correspondence to the organization.

11. A data processing system for email messaging, comprising:

a processor;

a memory accessible to the processor storing programs and data objects therein, the programs including an email client application and an email user interface, wherein execution of the programs cause the processor to perform the steps of:

accepting as input intended recipients of an email message prior to sending, wherein there are two or more intended recipients;

determining that the intended recipients comprise a subgroup of one or more defined recipient groups, wherein each of the defined recipient groups has a plurality of other members;

ranking the defined recipient groups according to a predefined strength function;

identifying one of the defined recipient groups as a top ranked recipient group among the defined recipient groups;

providing a prompt to select the top ranked recipient group to thereby add all of the other members of the top ranked recipient group as new recipients of the email message so as to direct the email message to all the members of the top ranked recipient group; and responsively to a user response to the prompt automatically adding all the other members as addressees of the email message.

12. The data processing system as claimed in claim 11, wherein the programs cause the processor to perform the additional steps of:

providing a transfer option prompt to amend the intended recipients by moving the intended recipients from a "to" addressee list to a blind carbon copy ("bcc") addressee list when a number of the intended recipients exceeds a threshold value; and automatically transferring the intended recipients to the bcc addressee list responsively to a user transfer response to the transfer option prompt.

13. The data processing system according to claim 11, wherein the programs cause the processor to perform the additional steps of:

providing an additional prompt to add a plurality of members of other defined recipient groups as new recipients of the email message so as to direct the email message to all the members of the other defined recipient groups; and responsively to a user response to the additional prompt automatically adding the plurality of members of the other defined recipient groups as the new recipients of the email message.

14. The data processing system according to claim 11, wherein the programs cause the processor to perform the additional step of deriving the defined recipient groups from senders and recipients of previous email messages, wherein the strength function comprises at least one of a number and respective dates of the previous email messages.

15. The data processing system according to claim 11, wherein the programs cause the processor to perform the additional step of deriving the defined recipient groups by defining a variable for each pair of an individual in an organization and the organization that indicates a likelihood of the individual sending email correspondence to the organization.

* * * * *